United States Patent [19]

Gautier et al.

[11] Patent Number: 4,623,494

[45] Date of Patent: Nov. 18, 1986

[54] ATMOSPHERIC COOLING TOWER WITH REDUCED VAPOR CLOUD

[75] Inventors: Daniel M. Gautier, Vigny; Andre Lagoutte, Villemonble, both of France

[73] Assignee: Electricite de France, France

[21] Appl. No.: 695,000

[22] Filed: Jan. 25, 1985

[30] Foreign Application Priority Data

Jan. 25, 1984 [FR] France ................................ 84 01135

[51] Int. Cl.⁴ ............................................. B01F 3/04
[52] U.S. Cl. ..................................... 261/161; 165/60; 165/900; 261/153; 261/158; 261/DIG. 11; 261/DIG. 77
[58] Field of Search ........................ 261/153, 158–161, 261/DIG. 11, DIG. 77, 111; 165/60, DIG. 1, 900

[56] References Cited

U.S. PATENT DOCUMENTS

| 980,108 | 12/1910 | Lillie | 261/161 X |
|---|---|---|---|
| 3,403,531 | 10/1968 | Oesterheld | 261/158 X |
| 3,831,667 | 8/1974 | Kilgore et al. | 261/DIG. 77 |
| 3,844,344 | 10/1974 | Kliemann et al. | 261/DIG. 77 |
| 3,846,519 | 11/1974 | Spangemacher | 261/DIG. 77 |
| 3,923,935 | 12/1975 | Cates | 261/DIG. 77 |
| 3,994,999 | 11/1976 | Phelps | 261/DIG. 77 |
| 3,995,689 | 12/1976 | Cates | 165/DIG. 1 |
| 4,315,873 | 2/1982 | Smith et al. | 261/DIG. 77 |
| 4,317,785 | 3/1982 | Dickey, Jr. et al. | 261/111 |
| 4,427,607 | 1/1984 | Korsell | 165/DIG. 1 |
| 4,439,378 | 3/1984 | Ovard | 261/111 |
| 4,512,937 | 4/1985 | Hoffmann | 261/111 |

FOREIGN PATENT DOCUMENTS 2459437  2/1981  France ............................... 261/153

Primary Examiner—Richard L. Chiesa
Attorney, Agent, or Firm—Larson & Taylor

[57] ABSTRACT

A wet atmospheric cooling tower has a vertical chimney defining an air path from air inlet openings at the lower end thereof for admitting atmospheric air to an exhaust opening at the upper end thereof, a stationary packing extending circumferentially without any gap across the air path, and a distributor for spraying water to be cooled onto the packing from above. Water is cooled down by air while it flows down across the packing. For dry air-water heat exchange air ducts extend through the packing and open into the air path in a zone which is downstream of the packing. The heat exchanger includes a two dimensional network of passages arranged to receive atmospheric air only and distributed according to a two dimensional network.

9 Claims, 8 Drawing Figures

ATMOSPHERIC COOLING TOWER WITH REDUCED VAPOR CLOUD

BACKGROUND AND SUMMARY OF THE INVENTION

The invention relates to atmospheric cooling towers of the kind comprising a vertical chimney or cup providing buoyancy or draft, a distributor supplied with water flowing from the distributor and dispersing it in currents streaming down over a packing having no gap in the circumferential direction and a basin for collecting the water cooled by contact with an air flow penetrating through openings in the lower part of the chimney and rising through this latter.

Cooling towers of this type are known (French Pat. No. 2,459,437). They are more and more widely used in power stations other than those situated on the coast for the delivery rate which rivers can supply is frequently insufficient for cooling the condenser of a high power thermal power station without an excessive rise in temperature. The absence of gaps, such as those provided in U.S. Pat. No. 3,846,519 allows the thermal power which may be removed by the cooling tower to be kept at a higher value.

In these cooling towers, frequently qualified as wet, the water is cooled by direct convection and by evaporation of a fraction of the flow, which increases the water vapor content of the air. Partial condensation of vapor at the outlet of the chimney causes a vapor cloud. This cloud is visible at a very great distance under certain atmospheric conditions, especially in the case of high power cooling towers whose chimney has a height and a diameter of the order of 100 meters. In addition, the discharge of a large airflow having a water vapor content close to saturation may cause frost and ice to form in the vicinity. These harmful effects are even more troublesome when the cooling tower is of small height, with natural or forced draft.

In an attempt to overcome the problem, French Pat. No. 2,459,437 discloses a tower which comprises dry air passages formed directly in the elements over which the water streams, but only in such elements. Water inevitably enters into the dry air passages and the advantages to be gained are quite limited. A cooling tower according to French Pat. No. 2,409,481 comprises a "contact body" in which dry air flow passages are formed. The passages do not extend beyond the zone where sprinkling and streaming occur, in the case of a countercurrent cooling tower. A complex construction must be provided for preventing water coming from the sprinkling or spraying nozzles from entering the dry air passages. And the fact that the ducts do not extend downwardly out of the "contact body" causes humidification of the dry air.

It is an object of the invention to provide a cooling tower in which the discharged air has a lower hygrometric content than in prior wet cooling towers and the steam cloud is reduced in volume.

To this end, there is provided a cooling tower of the above-defined type which comprises a two dimensional network of passages for flowing dry air from intake openings of the tower to a zone in the chimney situated beyond the streaming zone, the passages being placed so that their surface is swept by water to be cooled. The fact that the dry air passages convey air from openings provided at the lower part of the chimney to a zone in the chimney situated beyond the streaming zone avoids ingress of water into the air passages.

The invention may be implemented either during the construction of a cooling tower or by adapting an already existing cooling tower, with relatively small modifications. Furthermore, the invention is applicable to crossed current cooling towers as well as to counter current cooling towers.

The air circulation passages may consist of ducts which form a "dry" heat exchanger which may be placed in parallel with the "wet" exchanger where direct contact of the air and the streaming water occurs; it may as well be in series relation with the wet exchanger.

In a crossed current exchanger for example, the ducts will be disposed substantially radially to the axis of the tower and between beds of slats and will extend radially from openings of the tower to beyond a circular trough for distributing the water to be cooled over the packing in the case of a parallel flow arrangement; for series mounting, the ducts, which may again be disposed substantially radially, may extend through an annular chamber through which water to be cooled flows before it is delivered to a circular trough for spraying water over the slats.

In a counter current exchanger, the ducts may be placed substantially vertically and project through the packing from underneath the packing to beyond the channels for distributing water to be cooled.

The invention will be better understood from the following description of particular embodiments given by way of examples only.

SHORT DESCRIPTION OF THE DRAWINGS

FIG. 1 is a diagrammatic front view of the lower part of a prior art wet counter current cooling tower, with part of the packing being illustrated schematically, in the right hand part of the Figure, FIGS. 2 and 3 are enlarged views of a fraction of a counter current cooling tower having the same general construction as that of FIG. 1, but in accordance with the invention, respectively in cross-section through a plane passing through the axis of the tower and in cross-section along line III—III of FIG. 2, FIGS. 4 and 5 show, respectively in cross-section through a plane passing through the axis and in the direction of arrow V of FIG. 4, a fraction of a crossed-current cooling tower comprising a dry exchanger in parallel flow relation with a wet exchanger, FIG. 6, similar to FIG. 4, shows a fraction of a crossed-current cooling tower having a dry exchanger in series with the wet exchanger, FIGS. 7 and 8 are, respectively, views in the direction of arrows VII and VIII of FIG. 6.

DETAILED DESCRIPTION OF PREFERRED EMBODIMENTS

Figure 1:
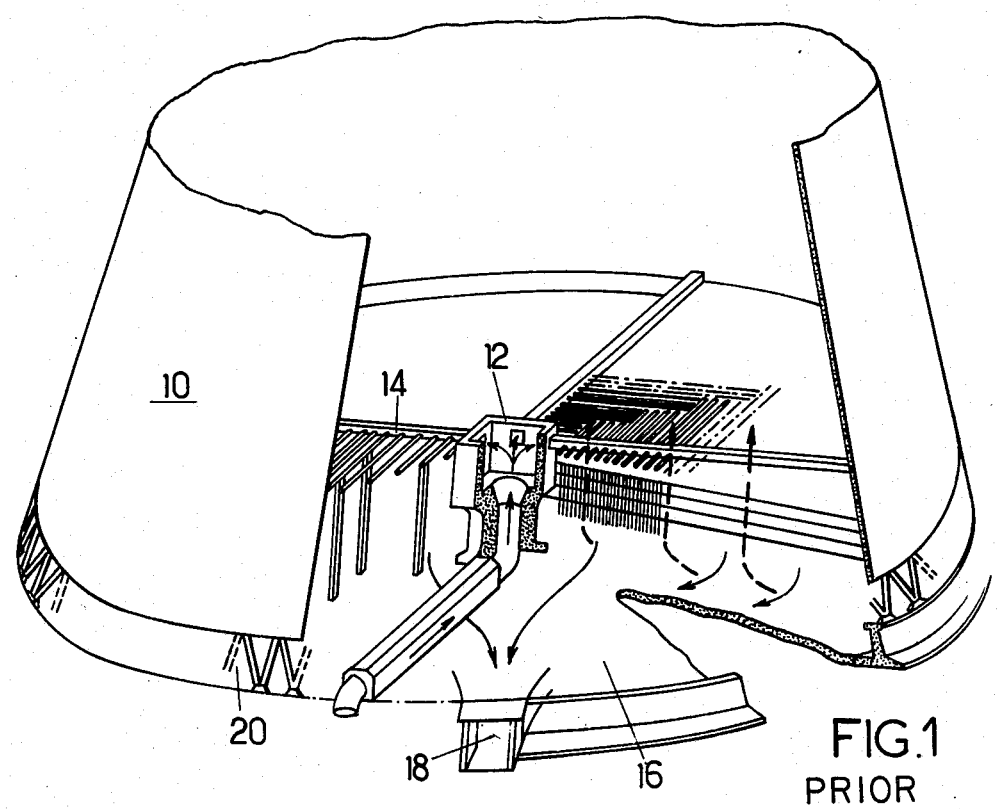

Referring to FIG. 1, a wet atmospheric cooling tower of the counter current type comprises a vertical chimney or cup 10, formed by a thin wall shell having a hyperboloid or double cone (diabolo) shape. In the center of the chimney a distributor 12 is supplied with warm water to be cooled at its lower part. Radial distribution pipes 14 (four in number as illustrated) extend horizontally from the distributor. A network of channels, generally of asbestos-cement, are connected to the pipes and formed along their lower generatrix with water spraying orifices. Water falling down from the channels bounces off dispersion cups and is distributed over vertical plates along which it flows while forming descending water films. Air passes vertically between the plates, under the effect of the natural draft. In any predetermined cylindrical cross-section of the cooling tower, the temperature of the water (whose path is shown by continuous line arrows) gradually decreases from top to bottom, whereas the humidity and temperature of the air flow (whose path is shown by brocken line arrows) steadily increases from bottom to top until saturation is reached. Cooled water is collected in a basin 16 from where it is removed by a water offtake 18. Basin 16 may be replaced by a network of chutes situated under the packing.

Figure 2:
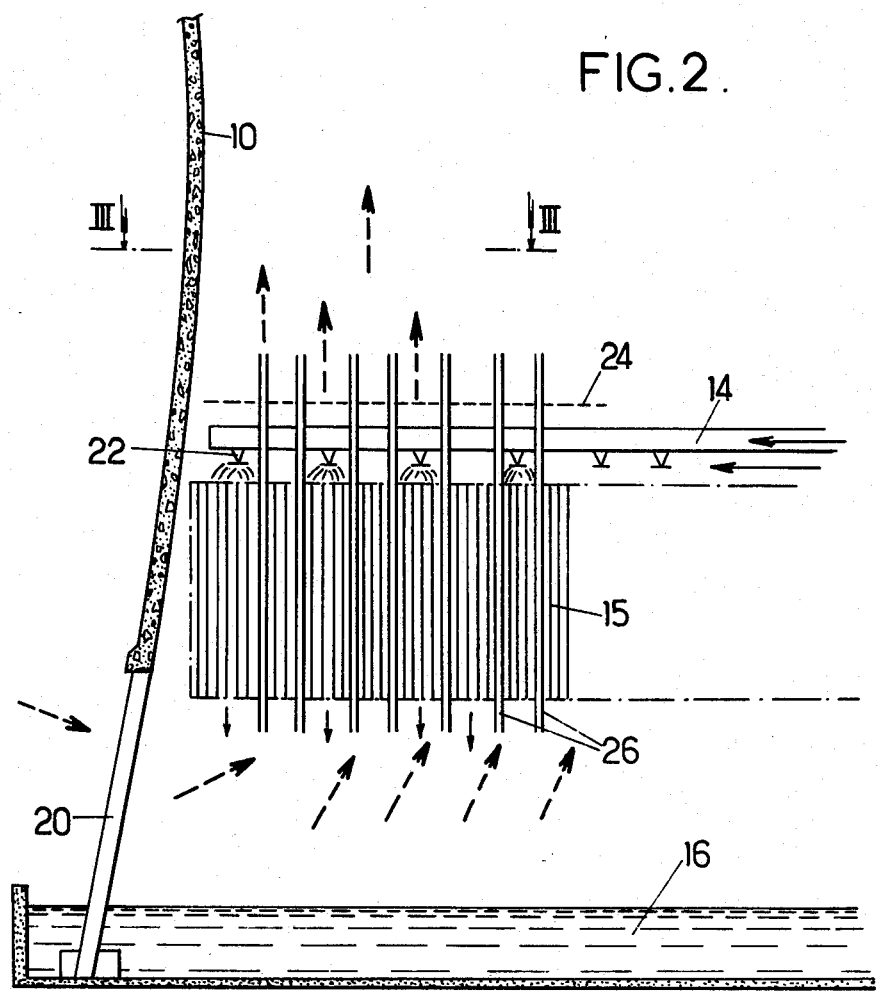

Referring to FIG. 1, the shell 10 is formed at its lower part with air intake openings 20; ducts 14 for distributing warm water to be cooled, packing 15 and basin 16 are again illustrated. In FIG. 2, distribution channels 22 above the packing 15 have also been shown schematically. Separators 24 are frequently placed above the packing and the ducts 14 for retaining the droplets.

Figure 3:
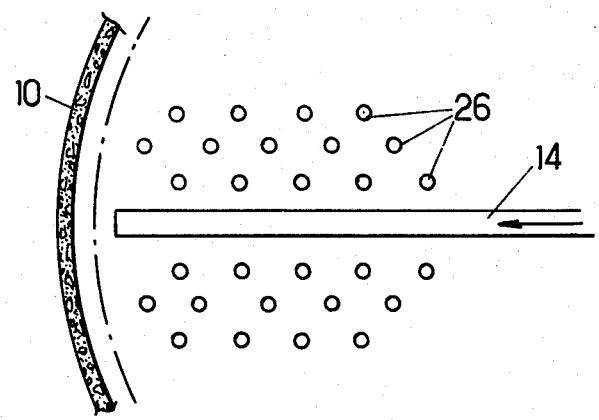

In the embodiment of the invention shown in FIGS. 2 and 3, a dry exchanger placed in parallel flow relation with the wet exchanger formed by the packing comprises a network of vertical ducts 26 projecting through the packing 15 and terminating at a level above the packing sufficient not to have ingress of water coming from ducts 14. The ducts 26 may be formed by tubes, which may be of circular cross section, for example of plastics (such as polyester) reinforced with glass fibers; the ducts project downwardly out of the packing and extend upwardly, beyond the level of separators 24. The ducts may also be formed more simply by providing evenly distributed passages in packing 15 and terminating the passages above the packing. In both cases, passages may for example be provided disposed according to a triangular lattice with 20 cm spacing.

Thus a dry exchanger is provided in parallel flow with a wet exchanger; dry air leaving ducts 26 mixes with the air which has passed through the wet exchange zone so as to provide a relatively homogeneous flow of hot air which is not saturated with water.

Figure 4:
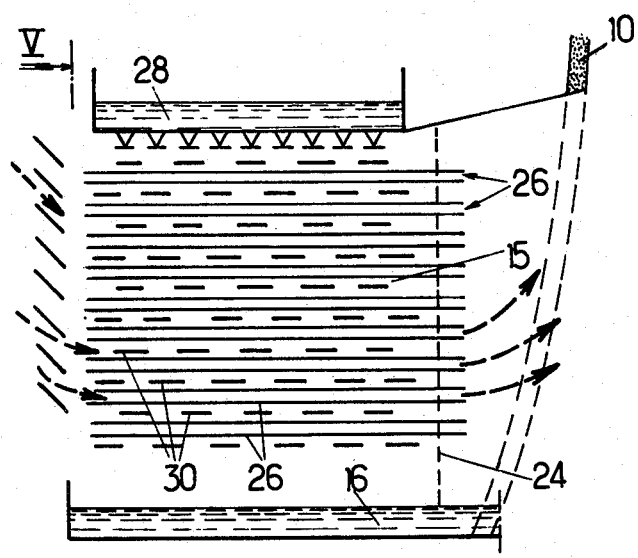
Figure 5:
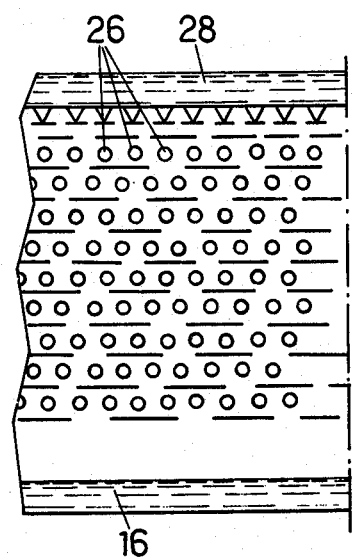

The crossed-current exchanger shown in FIGS. 4 and 5 (where the parts corresponding to those shown in FIGS. 2 and 3 are designated by the same reference numerals) comprises an annular trough 28 supplied from the distributor, dispersing water on a packing 15 which typically comprises slats of asbestos-cement, polyester or any other material, curved downwardly and in a staggered arrangement. Drops of water from trough 28 strike and burst on the slats, come together again, then burst again until they fall into the cooled water basin 16.

Referring to FIG. 5, a cooling tower has a dry exchanger placed in parallel flow with a wet exchanger in the path of the water. The dry exchanger is formed by air ducts for circulation of air from intake openings of the tower to a zone situated beyond the separators 24. By way of example, the ducts may be thin walled-tubes having a diameter of from 20 to 40 mm, spaced apart according to a triangular lattice with a spacing of about 20 cm. In a typical exchanger for a 900 MWe power station, the tubes 26 will be 8 to 10 m long.

That arrangement is easily implemented. It simply requires that existing structures be reinforced; there is no need to increase the blowing power in a forced draft cooling tower.

Figure 6:
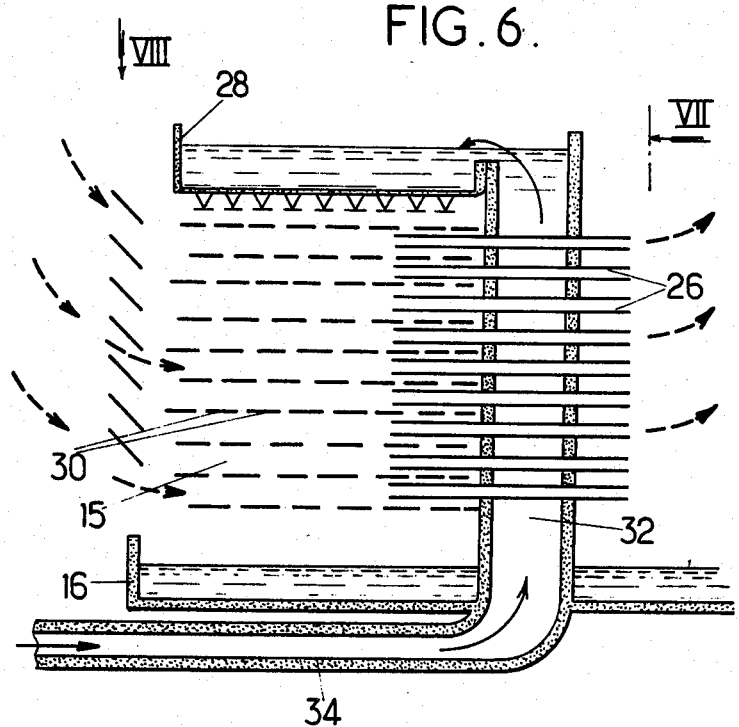
Figure 7:
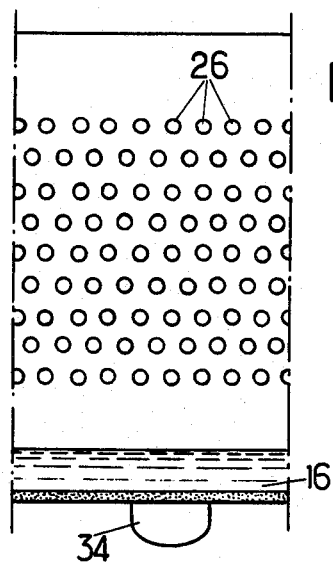
Figure 8:
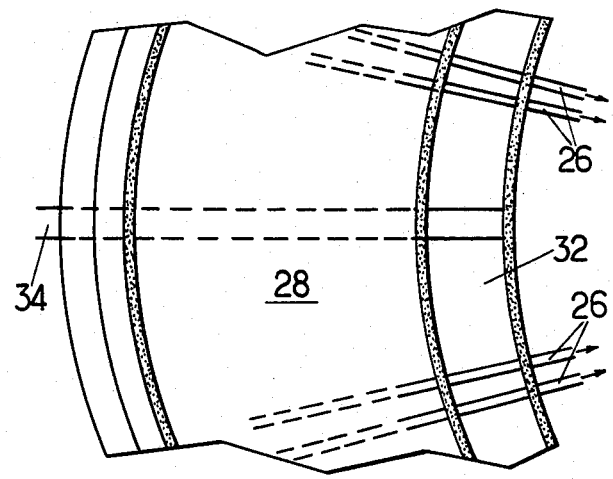

A crossed-current cooling tower may also be provided with a dry exchanger placed in series relation with a wet exchanger in the path of the water flow, as shown in FIGS. 6 to 8. The dry exchanger (or at least reduced humidity exchanger) comprises an annular chamber 32 defined by an annular concrete structure. The annular chamber 32 is provided, at its lower part, with an intake 34 for warm water to be cooled. It opens at its top part into the trough 28 for spraying water over the slats 30. The annular chamber 32 has air ducts 26 passing therethrough formed by thin walled-tubes made from plastics or other material. It is not necessary that the tubes extend through the whole of packing 15.

In this arrangement, warm water is already cooled by contact with tubes 26. The warm water contained in trough 28 is further cooled when running over slats and being sprayed along its path towards basin 16. This arrangement slightly increases the head loss in the air path. On the other hand, it allows additional cooling of the water.

The different approaches disclosed above may be combined, in particular in the case of a crossed-current cooling tower, in which a "mixed" exchange zone may be provided and where the wet dispersion is provided by ducts also providing "dry" exchange, followed by a downstream dry zone.

We claim:

1. A wet atmospheric cooling tower having:
   a vertical chimney defining an air path from air inlet openings at the lower end thereof for admitting atmospheric air to an exhaust opening at the upper end thereof;
   a stationary packing extending circumferentially without any gap across said air path and comprising a plurality of slats,
   water distribution means for spraying water to be cooled onto said packing from above said packing, whereby said water is cooled down by air while it flows down across said packing and along said slats,
   means for collecting water dripping from said packing and recirculating it to said water distribution means,
   and dry air-water heat exchange means comprising dry air ducts extending throughout said packing and defining passages parallel to the air path and arranged to receive atmospheric air only, said ducts having outlets in said air path in a zone of said air path which is beyond a downstream end of said packing and isolated from said water distribution means whereby water to be cooled down does not enter said outlets, said ducts being spaced from said slats and being distributed according to a two dimensional network between said slats and without any circumferential gap.

2. A crossed-current cooling tower according to claim 1, wherein some at least of said ducts are located substantially horizontally between beds of said slats constituting said packing and said ducts extend substantially radially from said inlet openings of the chimney through said packing until beyond a zone where running down and spraying of water occur.

3. A crossed-current cooling tower according to claim 1, wherein some at least of said ducts are located substantially radially and project through an annular chamber arranged on a water path of said water to be cooled, located on said water path upstream of an annular trough from which said water to be cooled is sprayed onto the packing.

4. A cooling tower according to claim 3, wherein said ducts project out of said chamber radially outwardly across said packing.

5. A counter-current cooling tower according to claim 1, wherein some at least of the ducts are substantially vertical and extend from under said packing up to said zone up to a level higher than said water distribution means.

6. A cooling tower according to claim 1, wherein said ducts project across the packing and extend beyond said packing at both ends thereof.

7. A cooling tower according to claim 1, wherein separator means are provided on the air path downstream of said packing on said air path and said ducts extend beyond said separator means.

8. A cooling tower according to claim 1, wherein said ducts are distributed according to a triangular lattice with a spacing of about 20 centimeters.

9. A wet atmospheric cooling tower having:

a vertical chimney defining an air path from air inlet openings at the lower end thereof for admitting atmospheric air to an exhaust opening at the upper end thereof, stationary packing means extending circumferentially without any gap across said air path, water distribution means for spraying water to be cooled onto said packing from above said packing, whereby said water is cooled down by air while it flows down across said packing, said water distribution means having a substantially vertical annular chamber receiving said water to be cooled and opening into an annular trough located above said packing and provided with water spraying means, said annular chamber being radially adjacent to the radially inner boundary of said packing, means for collecting water dripping from said packing, and air water heat exchange means comprising a plurality of ducts, projecting substantially radially through said annular chamber and into said packing, distributed according to a two dimensional lattice, whereby air which has circulated through said ducts mixes with air which has been subjected to crossed-current heat exchange with sprayed water in a zone of the air path which is downstream of said packing.

* * * * *